W. AKEMANN.
FIRE CONTROL APPARATUS PARTICULARLY INTENDED FOR NAVAL GUNS.
APPLICATION FILED SEPT. 17, 1920.

1,401,028.

Patented Dec. 20, 1921.
2 SHEETS—SHEET 1.

Inventor
Walther Akemann
By Kiefer Bros
Attys

W. AKEMANN.
FIRE CONTROL APPARATUS PARTICULARLY INTENDED FOR NAVAL GUNS.
APPLICATION FILED SEPT. 17, 1920.

1,401,028.

Patented Dec. 20, 1921.
2 SHEETS—SHEET 2.

Inventor,
Walther Akemann,
By Knight Bros.
attys.

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

FIRE-CONTROL APPARATUS PARTICULARLY INTENDED FOR NAVAL GUNS.

1,401,028. Specification of Letters Patent. Patented Dec. 20, 1921.

Application filed September 17, 1920. Serial No. 411,031.

*To all whom it may concern:*

Be it known that I, WALTHER AKEMANN, residing at Essen, Germany, a citizen of the German Republic, have invented a certain new and useful Improvement in Fire-Control Apparatus Particularly Intended for Naval Guns (for which I have filed application in Germany, filed July 30, 1918,) of which the following is a specification.

The present invention relates to an improvement in the fire control apparatus described in the specification of Serial No. 408,072, now Patent No. 1,387,440.

The invention will be described with reference to the accompanying drawing, which shows diagrammatically a construction intended for naval guns.

Figure 1:
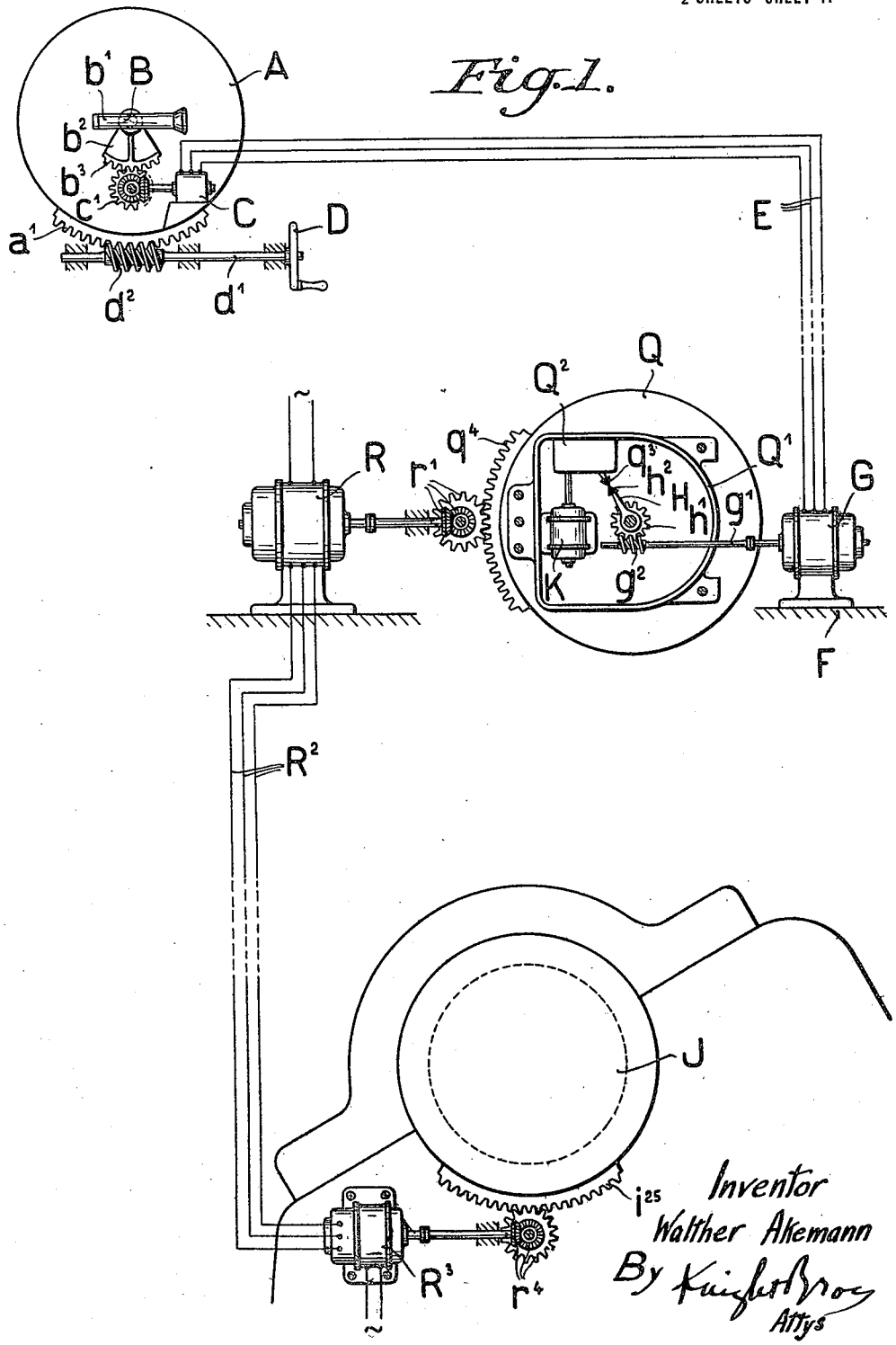
Figure 1 is a complete view of the fire control apparatus.

At the observing station is mounted a gyroscope casing A which can be oscillated about a horizontal axis. The axis B on which the sighting telescope $b^1$ is mounted and which is adapted to be stabilized by a gyroscope (not shown) suspended by a Cardan suspension, coincides with the axis of oscillation of the casing. To the said axis B is rigidly connected a toothed sector $b^2$, which is connected by a toothed wheel gearing $b^3$, $c^1$, to the rotating part of a transmitter C of an electrical long distance controlling apparatus mounted on the gyroscope casing A.

The casing A is oscillated about its horizontal axis by a hand wheel D, on the shaft $d^1$ mounted on the base of the casing said shaft $d^1$ carrying a worm $d^2$ coöperating with a series of teeth $a^1$ on the casing A.

The transmitter C is electrically connected by means of a long distance conductor E with the receiver G assigned to it. On the shaft $g^1$, of the receiver G, is mounted a worm $g^2$, which gears with a worm wheel $h^1$. The worm wheel $h^1$ is mounted to rotate loosely on a disk-shaped member Q and to the said worm wheel $h^1$ is rigidly connected an arm H the free end of which is constructed in the form of a tongue-shaped circuit-closing piece $h^2$. The general arrangement of the long distance controlling apparatus C, E, G, which transmits a rotary movement of the sighting telescope $b^1$ to the arm H is so arranged that every rotary movement of the sighting telescope $b^1$ results in a corresponding rotary movement of the arm H and consequently of the circuit-closing piece $h^2$.

On the front of the disk-shaped member Q is rigidly attached a box $Q^1$, which contains in its interior in addition to the parts $g^2$, $h^1$, H, $h^2$, already mentioned a small casing $Q^2$ and a motor K. This motor K is provided for the purpose of adjusting, by means of a mechanism placed within the casing $Q^2$ (which mechanism will be described below.) A circuit-closing piece $q^3$ coöperates with the before mentioned circuit-closing piece $h^2$ to just correspond to the required preliminary ignition angle. The circuit-closing pieces $q^3$ and $h^2$ are included in a circuit which contains the firing magnet of the gun (not shown) and they form a circuit-closing device, by means of which the operation of firing the gun can be accomplished. The box $Q^1$ is closed at the front by a cover (not shown in the drawing) in which is placed a piece of glass for the purpose of observing the position of the arm H and also that part of the pinion gear inclosed in the casing $Q^2$ which coöperates therewith.

The disk-shaped member Q is adapted to rotate about an axis which coincides with the axis of the worm wheel $h^1$ and is connected by means of the gearing $q^4$ $r^1$ with the rotating part of a receiver R. This receiver R is connected through a conductor $R^2$ to the transmitter $R^3$ of a long distance controlling apparatus, the rotating part of which is positively connected through a toothed wheel gearing $r^4$, $i^{25}$, with one of the horizontal trunnions J of the gun to be controlled. The general arrangement of the long distance controlling apparatus $R^3$, $R^2$, R, which transmits a rotary movement of the trunnion J to the disk-shaped member Q is such that every rotary movement of the trunnion J results in a corresponding rotary movement of the member Q and consequently of the circuit-closing piece $q^3$.

Figure 2:
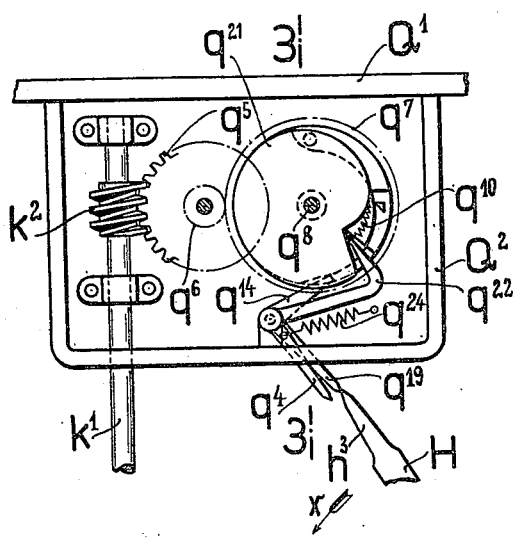
Fig. 2 is a portion of Fig. 1 drawn to an enlarged scale.
Figure 3:
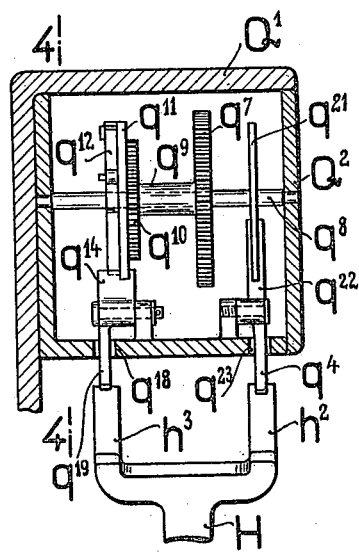
Fig. 3 is a section on line 3—3 of Fig. 2 looking from the left.
Figure 4:
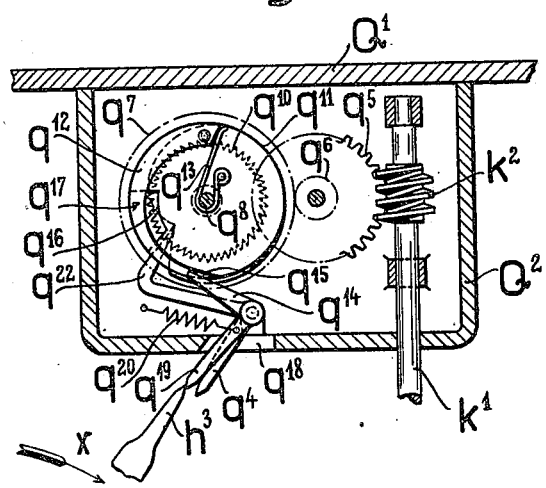
Fig. 4 is a section on line 4—4 of Fig. 3 looking from the left.

The mechanism inclosed in the casing $Q^2$ is shown on a larger scale in Figs. 2 to 4. A worm $k^2$ mounted on the shaft $k'$ of the motor K is carried in bearings in the casing $Q^2$ and gears with a worm wheel $q^5$, which by means of intermediate gearing $q^6$ $q^7$ drives a hollow shaft $q^9$ (see Fig. 3) which is adapted to rotate freely on a shaft $q^8$ carried in bearings in the casing $Q^2$. To the hollow shaft $q^9$ is rigidly attached a toothed ratchet wheel $q^{10}$. On a circular-shaped disk $q^{11}$ keyed close up against the ratchet wheel $q^{10}$ is pivotally mounted a pawl $q^{12}$ which bears against a pawl $q^{14}$ mounted on the casing $Q^2$. This pawl $q^{14}$ (see particularly Fig. 3) is wider than the pawl $q^{12}$ and bears when in the position shown in the drawing against a recess $q^{15}$ in the disk $q^{11}$. (See Fig. 4.) The disk $q^{11}$ has a gap in it, $q^{13}$, through which a tooth $q^{17}$ fixed on the pawl $q^{12}$ projects. When the pawl $q^{14}$ emerges from the recess $q^{15}$ in the disk $q^{11}$ and releases the pawl $q^{12}$, this tooth can engage under the action of the spring $q^{13}$ (see Fig. 4) with the ratchet wheel $q^{10}$ and thereby couple the hollow shaft $q^9$ to the shaft $q^8$. The release of the pawl $q^{12}$ is effected by a tongue $q^{19}$ which projects through a slot $q^{18}$ in the casing $Q^2$ and is rigidly connected to the pivot pin of the pawl $q^{14}$. The point of this tongue $q^{19}$ protrudes into the path of the tongue-shaped stop $h^3$ fixed on the arm H so that the stop $h^3$ can bear against tongue $q^{19}$ and when the stop $h^3$ moves in the direction of the arrow $x$ (see Figs. 2 and 4) can carry the tongue $q^{19}$ a short distance against the action of a spring $q^{20}$ attached to the tongue $q^{19}$. On the shaft $q^8$ in addition to the disk $q^{11}$ is also keyed a disk cam $q^{21}$, against the spirally curved external surface of which, a hook-shaped lever arm $q^{22}$, of a bell crank lever pivotally mounted in the casing $Q^2$ bears, and the other arm of which is formed by the circuit-closing piece $q^4$. This circuit closing piece $q^4$ projects through a slot $q^{23}$ in the casing $Q^2$ and a tension spring $q^{24}$ attached to the circuit-closing pieces $q^4$ tends to permanently press the point of the lever arm $q^{22}$ against the edge of the disk cam $q^{21}$. The length of the circuit-closing piece $q^4$ is so calculated, that its point projects into the path of the circuit-closing piece $h^2$ on the arm H, so that the two circuit-closing pieces $h^2$ and $q^4$ can in passing, say, during the upward rolling of the ship, touch each other. The tongue $q^{19}$ and the circuit-closing piece $q^4$ inclose, in the position shown in the drawing, in which the pawl $q^{14}$ bears against the recess $q^{15}$ and the hook-shaped lever arm $q^{22}$ lies on the lowest point of the disk cam $q^{21}$, a small angle with each other, so that on a rotary movement of the arm H, in the direction of the arrow $x$ the tongue $q^{19}$ must be touched by the stop $h^3$ a little sooner than the circuit-closing piece $h^2$ can come into contact with the circuit-closing piece $q^4$.

In order that the working of the above described fire control apparatus may be readily understood it will be assumed that the ship which is floating in a horizontal position does not roll and the parts are in the position shown in the drawing.

If for example, the gun is to be laid to correspond to the range of the target and fired, the sighting telescope $b^1$ is directed on to the target while the gyroscope is in action and maintained in this position. The gyroscope casing A is next rocked by turning the hand wheel D through the angle of elevation $\alpha$ which corresponds to the range of target. This rocking movement of the gyroscope casing A, through the medium of the long distance controlling apparatus C, E, G, results in a corresponding movement of the arm H connected to the receiver G and therefore the circuit-closing piece $h^2$ and stop $h^3$ mounted on the arm H are rotated through a similar angle of elevation $\alpha$. The gun barrel is then rocked by means of an elevating gear (not shown) and which may be controlled from a distance if desired, about the horizontal trunnions until the circuit closing piece $q^3$ connected to the trunnions J by the long distance controlling apparatus $R^3$, $R^2$, R, and which therefore takes part in the rocking movement of the gun barrel as before stated is again opposite the circuit-closing piece $h^2$. As soon as these movements have been accomplished the circuit-closing piece $q^3$ and also the gun barrel will have been rotated out of their original angular position through an angle $\alpha$ which corresponds to the range of the target. The gun barrel therefore assumes an elevation corresponding to the range of the target relatively to the ship floating in its horizontal position and the firing of the gun is effected by hand.

If the ship rolls, and if the firing of the gun is to take place automatically at an instant, which lies by a period of time equal to the delay in firing, in advance of the instant in which the ship passes through the horizontal floating position, it is then necessary, to adjust the two circuit-closing pieces $h^2$ and $q^3$ relatively to each other through an advanced ignition angle corresponding to the delay in firing. For this purpose the motor K is set in motion and kept at a constant number of revolutions. The hollow shaft $q^9$ connected to the motor K by the intermediate gears $k^2$, $q^5$, $q^6$, $q^7$, consequently together with the ratchet wheel $q^{10}$ rotate with a uniform velocity. When therefore by the rotation of the arm H in the direction of the arrow $x$, the stop $h^3$ on the arm H bears against the tongue $q^{19}$, the pawl $q^{14}$ leaves the recess $q^{15}$ in the disk $q^{11}$ and consequently releases the pawl $q^{12}$. This latter bears, under the action of the spring $q^{13}$, with its tooth $q^{17}$ against the ratchet wheel $q^{10}$. By this means the coupling between the hollow shaft $q^9$ connected to the ratchet wheel $q^{10}$ and the shaft $q^8$ which carries the disk $q^{11}$ and the disk cam $q^{21}$ is established and the rotary motion of the motor shaft $k^1$ is transmitted to the shaft $q^8$. On the rotation of the disk cam $q^{21}$ which now commences, the hook-shaped lever arm $q^{22}$ slides on the edge of the disk cam, and this results in a displacement of the circuit-closing piece $q^4$ in such a direction that the said circuit-closing piece $q^4$ moves out of the way of the circuit-closing piece $h^2$ as this latter moves in the direction of the arrow $x$. The curvature of the disk cam $q^{21}$ is so designed geometrically that on the rotation of the said cam, the circuit-closing piece $q^4$ at first moves rapidly and then more slowly through such an angular amount that the circuit-closing piece $h^2$ which follows it with an approximately equal movement touches it in a position which lies by the amount of the desired advanced ignition angle in advance of the point in which the gun barrel and consequently the disk-shaped member Q assume the before described elevation relatively to a horizontal plane. At the instant of contact of the circuit-closing pieces $q^4$ and $h^2$, the firing circuit is closed, the shot is fired and the projectile leaves the barrel exactly at the instant in which the said barrel assumes the before described elevation angle in respect to a horizontal plane. On the further movement of the arm H the circuit-closing piece $h^2$ and the stop $h^3$ come out of the path of the circuit-closing piece $q^4$ and the tongue $q^{19}$ so that these parts can return under the influence of the tension springs $q^{24}$ and $q^{20}$ into the position shown in Fig. 2, as soon as the shaft with the disks $q^{11}$ and $q^{21}$ has made one complete revolution when the pawl $q^{14}$ will again bear on the recess $q^{15}$ and against the pawl $q^{12}$, thus disconnecting the shaft $q^8$ from the hollow shaft $q^9$, so that the shaft $q^8$ comes to a standstill.

The above described fire control apparatus has all the advantages described in the before mentioned specification but with the advantage that the sensitive circuit-closing piece and also the sensitive parts of the pinion gear belonging thereto are not mounted on the gun and so subjected to the concussion of the firing. It is consequently superior to the fire control apparatus described in the before mentioned specification first by its great reliability of action and secondly by the fact that its degree of accuracy is independent of the number of shots fired.

If a number of guns are to be connected to a single gyroscope sighting apparatus, a single receiver for the long distance controlling apparatus may be connected to the gyroscope sighting device, and the adjustable parts thereof and the circuit-closing pieces ($h^2$) assigned to the various guns for reproducing the exact angle of the adjustments of the sighting line connected thereto. In this case it is possible, to arrange the circuit-closing devices belonging to the different guns together with the pinion gears belonging thereto in one casing. The application of the invention to a fire control apparatus for a number of guns consequently affords a particularly simple construction.

Claims:

1. An apparatus of the class described comprising a sighting device, means for stabilizing said sighting device, a carrier for said stabilizing apparatus, means for adjusting said carrier to correspond to the range, a transmitter operatively connected to said sighting telescope, a receiver, means operatively connecting said transmitter to said receiver, an arm operatively connected to said receiver, a second transmitter connected to and operated by the trunnion of a gun, a second receiver connected to said second transmitter for synchronous operation therewith, a disk-shaped member, an arm coöperating with said first mentioned arm carried by said disk, means connecting said disk to said second receiver for rotating the same, substantially as and for the purpose set forth.

2. An apparatus of the class described comprising a sighting telescope, a gyroscope for stabilizing said sighting telescope and a casing therefor, means for adjusting said casing, a transmitter connected to said sighting telescope, a receiver, electrical long distance means connecting said transmitter to said receiver, an arm operated by said receiver, a contact piece carried by said arm, a second transmitter operatively connected to the trunnion of a gun so as to take part in its rotary movement, a second receiver, electrical long distance means connecting said second transmitter and receiver, a disk-shaped member rotatably mounted on an axis which coincides with the axis of said arm, a second contact piece carried by said disk-shaped member, means connecting said receiver to said disk-shaped member for rotating the same and means mounted on said disk and operatively connected to said second contact piece for adjusting the same to the advanced ignition angle.

3. An apparatus of the class described comprising a sighting telescope, means for stabilizing said sighting telescope, a casing for said stabilizing means, means for adjusting said casing to correspond to the range, a transmitter operatively connected to said sighting telescope, a receiver operatively connected by an electric long distance means to said transmitter, an arm operatively connected to said receiver, a circuit closing piece carried by said arm, a second transmitter operatively connected to the trunnion of a gun so as to take part in its rotary movement, a second receiver separated from the gun and connected for synchronous operation with said second transmitter, a disk-shaped member mounted for rotation on an axis which coincides with the axis of said arm, means operatively connecting said second receiver to said disk-shaped member for rotating the same, a second circuit closing piece carried by said disk-shaped member, said second circuit closing piece coöperating with said first mentioned circuit closing piece and means carried by said disk-shaped member and operatively connected to said second circuit closing piece for adjusting the same to correspond to the advanced ignition angle.

The foregoing specification signed at Essen, Germany, this 16th day of June, 1920.

DR. WALTHER AKEMANN.

In presence of—
HANS GOTTSMANN,
JOHANN DECKERS.